United States Patent
Lang et al.

(10) Patent No.: US 11,203,299 B2
(45) Date of Patent: Dec. 21, 2021

(54) VIEW SYSTEM FOR A VEHICLE

(71) Applicant: MEKRA Lang GmbH & Co. KG, Ergersheim (DE)

(72) Inventors: Werner Lang, Ergersheim (DE); Stefan Centmayer, Ergersheim (DE); Christian Traub, Ansbach (DE)

(73) Assignee: MEKRA LANG GMBH & CO. KG, Ergersheim (DE)

( * ) Notice: Subject to any disclaimer, the term of this patent is extended or adjusted under 35 U.S.C. 154(b) by 0 days.

(21) Appl. No.: 16/861,812

(22) Filed: Apr. 29, 2020

(65) Prior Publication Data

US 2020/0346582 A1    Nov. 5, 2020

(30) Foreign Application Priority Data

May 3, 2019  (DE) .................... 10 2019 111 512.4

(51) Int. Cl.
| | |
|---|---|
| B60R 1/12 | (2006.01) |
| H04N 5/225 | (2006.01) |
| B60Q 1/00 | (2006.01) |
| B60S 1/02 | (2006.01) |
| G06K 9/00 | (2006.01) |

(52) U.S. Cl.
CPC .............. B60R 1/12 (2013.01); B60Q 1/0023 (2013.01); B60S 1/02 (2013.01); G06K 9/00791 (2013.01); H04N 5/22521 (2018.08); *B60R 2001/1253* (2013.01); *G06K 9/00369* (2013.01)

(58) Field of Classification Search
None
See application file for complete search history.

(56) References Cited

U.S. PATENT DOCUMENTS

| | | | | |
|---|---|---|---|---|
| 5,623,340 | A * | 4/1997 | Yamamoto | G01N 21/8806 356/237.4 |
| 10,192,113 | B1 * | 1/2019 | Liu | G06K 9/00791 |
| 10,437,252 | B1 * | 10/2019 | Liu | G05D 1/0287 |
| 10,496,104 | B1 * | 12/2019 | Liu | G01S 5/16 |
| 10,706,293 | B1 * | 7/2020 | Lei | G07C 5/0808 |
| 10,794,710 | B1 * | 10/2020 | Liu | H04N 13/239 |
| 2005/0219523 | A1 * | 10/2005 | Onuma | G01N 21/8806 356/239.5 |

(Continued)

FOREIGN PATENT DOCUMENTS

| | | | |
|---|---|---|---|
| DE | 4132425 A1 | 4/1992 | |
| DE | 102006044786 A1 * | 3/2008 | G03B 17/18 |

(Continued)

*Primary Examiner* — Fekadeselassie Girma
(74) *Attorney, Agent, or Firm* — Cozen O'Connor

(57) ABSTRACT

A view system (100A, 100B) for a vehicle (1) has at least one image capture unit (10A, 10B) for capturing image data of an area around the vehicle (1), wherein the image capture unit (10A, 10B) has an image sensor (11A, 11B) and an optical element (12A, 12B), at least one image processing unit (20A, 20B) for processing the image data captured by the image capture unit, and at least one light source (40, 40.1, 40.2) for illuminating the optical element (12A, 12B). The view system is configured to highlight the recognizability of a foreign particle (S, T), which is located on the optical element (12A, 12B), on the image sensor (11A, 11B) of the image capture unit (10A, 10B) by means of the illumination of the optical element (12A, 12B).

27 Claims, 5 Drawing Sheets

(56) References Cited

U.S. PATENT DOCUMENTS

| | | | |
|---|---|---|---|
| 2006/0122832 A1* | 6/2006 | Takiguchi | G10L 21/0208 704/240 |
| 2008/0303670 A1* | 12/2008 | Seidel | G08B 13/06 340/572.1 |
| 2012/0321139 A1* | 12/2012 | Qi | G06K 9/00536 382/107 |
| 2016/0004144 A1* | 1/2016 | Laroia | G03B 17/18 348/222.1 |
| 2016/0137126 A1* | 5/2016 | Fursich | H04N 13/239 348/38 |
| 2017/0091952 A1* | 3/2017 | Sun | G06K 9/6223 |
| 2017/0216479 A1* | 8/2017 | Losert | A61F 13/0243 |
| 2018/0221871 A1* | 8/2018 | Roberts | B01L 7/00 |
| 2019/0122027 A1* | 4/2019 | Prideaux-Ghee | G06T 7/246 |
| 2019/0208317 A1* | 7/2019 | Woodruff | G10L 21/028 |
| 2020/0079325 A1* | 3/2020 | Tilleman | G01N 21/958 |
| 2020/0103433 A1* | 4/2020 | Lai | G03F 7/70033 |
| 2020/0167969 A1* | 5/2020 | Lerzer | G06K 9/00805 |
| 2020/0213581 A1* | 7/2020 | Lu | G06T 7/0002 |
| 2021/0037236 A1* | 2/2021 | Gavrilovic | G01P 15/18 |
| 2021/0239955 A1* | 8/2021 | Dai | G01N 21/6428 |
| 2021/0268785 A1* | 9/2021 | Peters | G01S 7/4811 |

FOREIGN PATENT DOCUMENTS

| | | | | |
|---|---|---|---|---|
| DE | 102006044786 A1 | 3/2008 | | |
| DE | 102014006153 A1 | 10/2015 | | |
| EP | 3437929 | 2/2019 | | |
| EP | 3437930 A1 | 2/2019 | | |
| JP | 2009173260 A | * | 8/2009 | ......... G06K 9/00791 |

\* cited by examiner

VIEW SYSTEM FOR A VEHICLE

BACKGROUND OF THE INVENTION

1. Field of the Invention

The present invention relates to a view system for a vehicle, in particular for a driver of a vehicle or for a driver assistant system, and relates in particular to a view system, which indicates a pollution of an optical element of the view system.

2. Description of the Related Art

In vehicles, it is legally prescribed to make so-called fields of view around the vehicle visible for the driver during driving operation. Which fields of view have to be visible is based on the type of the vehicle, for example, motorcycles, vehicles for transporting passengers, vehicles for transporting goods, etc. The viewability of the fields of view has to be provided by a device for indirect view and the fields of view have to be visible for the driver sitting on the driver's seat by use of the device for indirect view all the time. Dependent on the type of the vehicle and, in particular, on which areas around the vehicle can be directly viewed by the driver, different legal prescriptions require that certain fields of view are permanently and reliably viewable by use of the device for indirect view. In Europe, the fields of view, which have to be reliably visible for a driver at all times, are defined in the UN/ECE-regulation No. 46. Further, relevant norms and regulations, respectively, include for instance the ISO 5721, ISO 5006, ISO 16505, ISO 14401 and the EU 167/2013. Besides the legally required fields of view, often further regions around the vehicle, so-called areas of view, are made visible by devices for indirect view. Areas of view may include legally prescribed fields of view.

Commonly, the view of the fields of view is enabled with one or more mirrors. However, mirrors have some disadvantages. For instance, mirrors only show objects to the driver which are located on the same side of the mirror as the driver. Any object behind a mirror cannot be shown by this mirror. In addition, mirrors which are merely made of flat glass show a small region to the driver, except for the mirrors are very close to the driver. In case they are formed convexly, they generate an image distortion. Large vehicles commonly have six or more mirrors which are mounted around the outer side of the vehicle, most of them being convex and distorted which makes it difficult for the driver to pay attention to all relevant mirrors at the same time. Nevertheless, despite all the mirrors, there are still blind spots in the regions of view, i.e., the regions in which no fields of view are located, around these vehicles.

In recent times, it has been increasingly common to consider the use of camera systems as device for indirect view either in addition or as replacement for the mirror as device for indirect view. In such camera systems, an image is continuously captured and detected and processed, respectively, and stored, if so. The (video-) data which are captured by an image capture unit with an image sensor device are transmitted, e.g., by use of a supply unit and, optionally, after processing, to a reproduction device which is located in the driver's cabin. The reproduction device reproduces a view of the respective legally prescribed field of view or a plurality of fields of view and, optionally, further information such as potential collision risks, distances to other objects, etc. for the area around the vehicle in a manner that the fields of view are permanently visible for the driver at all times. At the same time, the view system promotes an improved night view, more flexible possibilities for arrangement and larger fields of view with a possibility of a lower distortion.

Permanently visible means in this context that the view into the field of view is depicted in a timely uninterrupted manner, that is, not interrupted by alternatingly showing and hiding the field of view or parts thereof, or by overlaying other representations such that the field of view cannot be seen completely. Accordingly, the respective field of view or the fields of view are continuously and in real time shown and made visible, respectively, on the display device. This holds at least for fields of view which are prescribed as permanently visible for all vehicle conditions in which the ignition is switched on and/or, preferably, for example, coupled to a sensor which receives a corresponding signal, for example, a door opening signal or an ignition switch signal.

Commonly, the camera systems are mounted on an outer side of the vehicle, in order to capture a portion around the vehicle. However, by mounting on an outer side of the vehicle, the camera systems are subjected to environmental impacts, such as pollutions or precipitation. In particular, foreign particles, such as dirt particles or rain drops, may settle on the lens of the camera or, generally, on an element which closes the camera to the outer side, and may impair the image data of the vehicle environment captured by the camera. In particular, with polluted camera lenses, it may arise that objects or persons in the vehicle environment are partially or completely hidden by the foreign particle and, thus, are not or not satisfactorily shown to the driver on a reproduction unit commonly mounted in the driver's cabin. This, in turn, results in that the driver does not sufficiently or not at all recognise objects or persons. Thereby, it may arise at collisions with the objects or persons not recognised by the driver and, thus, potentially at heavy accidents.

At the moment, lens pollutions are detected by means of image recognition programs or a view control of the camera by the driver. Image recognition programs detect a lens pollution alone on the basis of known patterns which are stored in a data base. However, as there are an endless number of patterns, which cannot all be stored in the data base, the detection of a lens pollution by means of image recognition programs is imprecise. The view control by the driver may commonly occur at vehicle standstills only and, thus, is also not satisfactory.

For example, a camera system which detects a pollution by means of a test ray is known from DE 10 2006 044 786 A1.

SUMMARY OF THE INVENTION

Accordingly, it is an object of the present invention to provide a view system for a vehicle, in particular for a driver of a vehicle, such as a commercial vehicle, or for a driver assistant system which allows to reliably detect one or more foreign particles on the optical element of an image capture unit.

An aspect of the invention is based on the idea to provide a view system with at least one image capture unit (e.g., a camera), at least one image processing unit (e.g., an ECU) and at least one light source, wherein the light source is arranged in the view system such that the optical element of the image capture unit is illuminated from outside of the image capture unit. By the illumination of the optical element, in case of a foreign particle on the optical element, the foreign particle is depicted well visible on the image sensor, i.e., more clearly than without an additional illumination. Thus, no image processing by use of known patterns, i.e. no image recognition, is performed for the identification of one or more foreign particles, but by radiation of the foreign particle, a more high-contrast and a more highlighted, respectively, depiction of the foreign particle is created directly on the image sensor. Thus, no post processing of the image data recorded by the image sensor with respect to the detection of foreign particles is required, but the foreign particle is already depicted clearly on the image sensor such that post processing of the image data captured by the image capture unit with regard to the depiction of the foreign particle is not necessary. Consequently, a realistic, nearly error-free depiction of foreign particles on optical elements of image capture units is reliably generated which may be identified either by the driver or by an image recognition unit as an element of a driver assistant system. With the vehicle, each vehicle is meant, such as a heavy goods vehicle (HGV), a passenger car or the like.

With an optical element, generally each element is meant which is passed by an incidental light ray which is to be depicted on the image sensor of the image capture unit, i.e., for instance also an arrangement of a plurality of single components, such as lenses.

With a good and clear recognizability is an increased contrast and an increased conspicuousness and an optical highlighting, respectively, of the foreign particle meant which is located on the optical element. Thus, the foreign particle is highlighted optically on the image sensor by the radiation with light such that the depiction of the optically highlighted foreign particle on the image sensor can be used without any further image processing. The use of circuitous and error-prone or imprecise image processing programs is omitted.

The light source is arranged in the view system such that the light rays emitted therefrom fall into the optical element from outside of the image capture unit. In other words, the light rays emitted by the light source run from the outside of the image capture unit through the optical element and impact afterwards on the image sensor and the image sensor surface, respectively, arranged behind the optical element. Outside of the image capture unit means from the outside of the unit consisting of the optical element and the image sensor. That is, the light source is spatially not arranged between the optical element and the image sensor and does not radiate the optical element from the inside (within the image capture unit), such as it would be the case if at least a part of the light rays emitted from the light source runs again back through the optical element after impact on a foreign particle. Rather, the light rays run only once through the optical element, in particular the component of the optical element which is arranged at the outermost position, and pass at least the component of the optical element arranged at the outermost position the first time from the outside to the inside, namely from a side of the optical element facing the vehicle environment to a side of the optical element facing the image sensor. Thus, a ray loss or an undesired deflection of rays is avoided and, consequently, a reliable depiction of an alleged foreign particle on the image sensor is possible.

According to a preferred embodiment, the view system further comprises at least one output unit, such as an image reproduction unit for reproducing the image data depicted on the image sensor. The at least one image reproduction unit may, for example, be a monitor, such as a LCD-, TFT- or LED-monitor, which is mounted in the driver's cabin such that the driver may well view into the monitor at any time, for example, at one or both A-columns or in the middle of the driver's cabin.

Alternatively or additionally, the view system may have an image recognition unit as output unit which recognizes the highlighted recognizability of the foreign particle on the image sensor by means of an algorithm. The algorithm may be a calculation method which is stored as software program in the image processing unit or a separate control unit. The image recognition unit is part of a driver assistant system. The images of the image recognition unit are, for instance, always analyzed in cases, in which the driver does not view into the monitor and, thus, cannot recognize a possible foreign particle. In this respect, it is, inter alia, possible to control the image recognition unit, if the image processing unit or any further control unit recognizes, due the driver's behavior (e.g., eye-tracking), that the driver does not view into the monitor. Alternatively or additionally, the image recognition unit may be controlled, if the driver views into the monitor, but cannot recognize a foreign particle, e.g., because the foreign particle depicted on the monitor is too small for the human eye or because, if a light pulse method is applied, which is dependent on the image rate of the image sensor or the reproduction unit, the foreign particle is illuminated only then, if no image is transmitted from the image sensor to the image processing unit and/or is shown by the monitor.

If the image recognition unit detects a foreign particle, the image recognition unit outputs a signal to a suitable cleaning means (automatic cleaning device) for removing the foreign particle and/or a warning signal to the driver. The removal of the foreign particle may occur by controlling a lens cleaning. The signal outputted to the driver may, for example, be an overlay display on the monitor, which optically highlights the foreign particle, e.g., by marking or highlighting, and/or a signal tone. Alternatively, during detection of a foreign particle, the image recognition unit may also output a signal to the image processing unit or another separate control unit which again outputs a signal for removal of the foreign particle and/or a signal to the driver. It is also conceivable that the image recognition unit or any other control unit of the view system interacts with the driving operation, e.g., brakes the vehicle as driver assistant system, in case that the driver does not react to the signal outputted to him and, e.g., a collision with an object, which is located in the vehicle environment in the portion on the image sensor where a foreign particle hides or distorts the view, impends.

In this respect, it is preferred that that the light source is arranged outside the area of view of the optical element, i.e., in particular outside the area which is depicted on the image sensor. The area of view of the optical element may, for instance, be a cone which extends starting from the optical element in the direction towards the outside, i.e., to the vehicle environment.

According to a preferred embodiment, the contrast of the foreign particle on the image sensor is highlighted by reflection and/or absorption of the light rays emitted by the light source at the foreign particle. If the foreign particle is, for instance, a bright or even pellucid (transparent) foreign particle, such as a water drop, the light rays of the light source are reflected at the outer side of the foreign particle. If the foreign particle is, for example, a dark or even opaque and half-transparent (non-transparent) foreign particle, such as a clod of earth, a thin layer of dust which depicts the vehicle environment as viewed through a haze on the image sensor, or a combination of a clod of earth and a water drop, the light rays of the light source are absorbed by the foreign particle. Dependent on the structure and the composition of the foreign particle with partially opaque and transparent portions, however, also mixtures of reflection and absorption are conceivable. A reflection and absorption of a foreign particle increases the optical conspicuousness of the foreign particle on the image sensor.

The light rays emitted by the light source impact either directly or indirectly from the outside onto the optical element. A direct impact is generated by a suitable arrangement of the light source to the optical element such that the light rays hit the optical element from the outside without detours or deflections. With an indirect impact, a deflection of the light rays of the light source occurs prior to the hitting on the optical element with the aid of a suitable deflection means, such as a prism or reflecting surfaces. An indirect hitting may, for example, be necessary if the composition of the view system does not allow to arrange the light source within the view system such that its light rays hit straight, i.e., on a direct way, the optical element, in particular without the need that the light source itself lies within the field of view, e.g., because the installation space does not allow such an arrangement.

Preferably, the light source is controlled such that the main part of the light rays emitted therefrom hits a portion of the optical element which is depicted on the image sensor. This means that the focus of the light rays emitted from the light source and, thus, a major part of the light rays hit the portion of the optical element which is depicted on the image sensor. This prevents that the entire optical element is illuminated and the driver or persons in the vehicle environment are irritated by a large-area illumination and saves costs. An illumination which is adapted to the depiction on the image sensor may, for instance, be realized by a movable light source and/or by a corresponding arrangement of the light source which is adapted, by means of the image processing unit or any other control unit, to the section of the vehicle environment which is depicted on the image sensor.

Preferably, the light source may be configured to operate with different light waves. For example, the light source may emit light waves which are visible for the human eye. Additionally or alternatively, the light source may be an infrared-light source which emits light waves in the near, the middle and/or the far infrared portion. In this respect, the light waves have preferably different colours, which are further preferably selected dependent on the environment. For example, the light waves may have red light in dark environments or white light in bright environments.

Independent on the light wave length, the light source may be configured to operate permanently or in timely defined intervals. By a permanent operation of the light source, it may be prevented that the driver is disturbed by light pulses. By a timely interrupted operation of the light source, it may be prevented that the driver is disturbed by the permanently generated contrast or experiences the environment unnaturally.

Preferably, the light source is configured to operate dependent on the image rate of the image sensor and/or the image recognition unit and the reproduction unit, respectively. The image rate of the image sensor describes how often the image sensor transmits/passes image data to the image processing unit. The image rate of the image recognition unit and the reproduction unit, respectively, describes how often an image is recognized in a defined time period from the image recognition unit and is displayed on the reproduction unit, respectively. If the operation of the light source is dependent on the image rate of the image sensor and/or the image recognition unit and the reproduction unit, respectively, for example, an image may be transmitted to the image processing unit and may be recognized by the image recognition unit, respectively, or may be displayed on the reproduction unit, if the illumination is switched off, and no image may be transmitted to the image processing unit and may be recognised by the image recognition unit, respectively, or may be displayed on the reproduction unit, if the illumination is switched on. As the image rate of the image sensor and/or the image recognition unit and the reproduction unit, respectively, is not viewable for the human eye, foreign particles are nevertheless reliably depicted on the image sensor and, thus, may be recognized by the image recognition unit and may be displayed and shown, respectively, on the reproduction unit, respectively. Thus, foreign particles are also recognized by illumination pulses. For example, the data of the illuminated time intervals depicted on the image sensor, but not depicted on the reproduction unit may be analyzed separately such that a foreign particle is recognized, but the driver is not disturbed by the illumination.

Preferably, the switching on and off of the light source and the operation for recognizing a foreign particle by illumination of the optical element, respectively, is controlled by at least one signal. In this respect, the at least one signal may be outputted by a brightness sensor, a rain sensor or a scanner. Or, vehicle specific signals, such as a speed, which is detected by a speed sensor or from position system data (e.g., GPS-data), a steering angle which is detected by an angle sensor, a reverse and forward driving which is detected from the respectively selected gear, etc., may be used as signals for controlling the light source. Alternatively or additionally, it is of course also conceivable that the driver may control the light source by a manual signal (such as pressing of a button, moving of a lever, operating of a touch pad which may also be the monitor of the image reproduction unit, or the like) or by his behavior itself (such as via eye-tracking).

According to a preferred embodiment, the light source has a luminous intensity and/or a luminous density and/or a luminous flux, each of which is adjustable. The luminous intensity indicates the luminous flux related to the spatial angle. The luminous density describes the brightness of the light related to a certain surface. The luminous flux means the sum of the light energy which is emitted by a light source independent on the direction. For example, the luminous intensity may depend on the brightness in the environment which is detected by the brightness sensor. For instance, the brighter the vehicle environment, the stronger the light source has to shine, in order to highlight a foreign particle on the reproduction unit, and the darker the vehicle environment, the weaker the light source has to shine, in order to highlight a foreign particle on the reproduction unit.

In this respect, the light source is preferably arranged to the optical element such that its emitted rays from defined viewing directions in the vehicle environment are not visible for the human eye. That means, a person which views the vehicle from the outside, does not recognize the presence of the light source. In this respect, the light source has, for example, a suitable shielding, such as a shielding plate, which deflects the light rays emitted by the light source to the optical element and avoids that the light rays emitted by the light source reach the environment of the vehicle. In particular, it is preferred that the shielding is configured such that in case of using red light this may only be seen from the vehicle backside and from behind, respectively, in case of using orange light, this may only be seen from the vehicle side, and in case of using white light, this may only be seen from the vehicle front side and from ahead, respectively.

The outermost component of the optical element may, for example, be a front glass or a lens. In general, the optical element is the element of the image capture unit which is located in an optical path, that is the way, which the light covers, if it runs from the light source or the vehicle environment through the image capture unit, between the position at which the light enters the image capture unit, and the position, at which the light hits the image sensor. In other words, the optical element is an element of the image capture unit which extends up to the outermost position of the image capture unit and, thus, forms the element of the image capture unit which faces the environment of the vehicle.

Preferably, the optical element has a filter which changes at least one light parameter during illumination. For example, the filter may be configured such that the wave length of the light is changed in the portion of foreign particles compared to the wave length, if the light passes the filter in an unhindered manner. For example, the optical element may have an infrared filter which is configured such that red light may be detected and recognised by an image recognition unit, however, is not visible for the human eye. Preferably, the filter is a coating which is provided on the optical element such that locations of the optical element, where foreign particles are present, shine differently during illumination than locations where no foreign particles are present. This may be, inter alia, advantageous during the use of black light, but is also conceivable for light with any other wave length.

Preferably, the light source is located in a spatial vicinity to the optical element. For example, it is advantageous, if the light source is located distally in a range from 0 to 50 mm from the optical element, further preferably in a range from 0 to 30 mm, further preferably from 0 to 15 mm, still further preferably in a range from 0 to 10 mm. In this respect, the light source may be integrated in the housing of the image capture unit, such that it is, for example, protected from environmental impacts, or may be arranged outside the image capture unit, such that it is, for example, well accessible and, thus, easy to maintain/service. If the light source is arranged outside the image capture unit, it may be directly attached to the vehicle or the housing of the image capture unit or by means of a suitable apparatus to the vehicle or the housing of the image capture unit.

According to a preferred embodiment, a plurality of light sources may be present for each camera (i.e., the optical element). These may be arranged in regular or irregular distances around the optical element. If a plurality of light sources is used, these may be controlled at different instances or simultaneously. The control of the particular light sources may occur dependent on one or more signals, which are, for example, outputted by a brightness sensor, a rain sensor or a scanner. Or, vehicle specific signals, such as a speed which is detected by a speed sensor or from positioning system data (e.g., GPS-data), a steering angle which is detected by an angle sensor, a reverse and forward driving which is detected from a respectively selected gear, etc., may be used as signals for controlling the light source. Alternatively or additionally, it is conceivable that the driver may control the light source by a manual signal (such as pressing of a button, moving of a lever, operating of a touch pad which may also be the monitor, or the like) or by his behavior itself (such as via eye-tracking).

Preferably, the light rays of the plurality of light sources are bundled before hitting on the optical element, for example, by suitable deflection systems, such as lenses, prisms, apertures, etc.

Alternatively or additionally, the light source may be provided with a optical wave guide and may be formed by an optical wave guide, which guides the light rays. In this respect, the optical wave guide may be attached directly to the light source, e.g., as lens, light guide rope, light guide element, at least partially around the optical element. In general, an optical wave guide is an at lease predominant transparent medium, which is configured to guide light along a certain distance.

The light source may, for example, be a LED (light-emitting diode, also called luminescence diode) or an OLED (organic light emitting diode) or a laser or a diode or a light bulb or a halogen lamp or a black light lamp.

With using a plurality of light sources, also combinations of the above-mentioned light sources are possible.

Preferably, the view system is a mirror replacement system for a commercial vehicle, further preferably a mirror replacement system according to the regulation UN/ECE R46. In this respect, the mirror replacement system may be a camera monitor system for one or more of the fields of view I to VI of the UN/ECE R46.

A further aspect of the present invention relates to a mirror replacement system for a vehicle with a view system as described above.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the invention is exemplarily described with reference to the figures, in which.

DETAILED DESCRIPTION OF THE EMBODIMENTS

Figure 1:
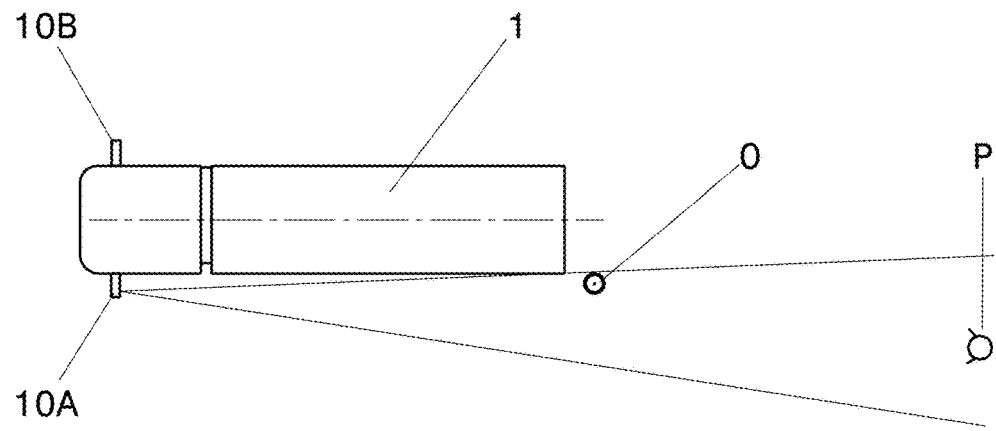
FIG. 1 shows a plan view of a commercial vehicle which has a view system according to an embodiment of the invention on each of a left and a right side of a driver's cabin.

FIG. 1 shows a plan view of a commercial vehicle 1, presently a heavy goods vehicle (HGV) with a tractor and a trailer/semi-trailer. At the left and right sides of the tractor, respectively, an image capture unit 10A, 10B is attached which is suitable to capture the vehicle environment which extends backwards to each of the left and right, respectively, adjacent to the vehicle, in the form of image data. In the area of view of the image capture unit 10A which extends in the plan view cone-shaped rearwards, an object O and a person P are located. The object O is located in the vicinity of the left rear corner of the trailer. The person P is located behind the HGV 1 approximately in the middle of the view cone of the capture unit 10A.

Figure 2:
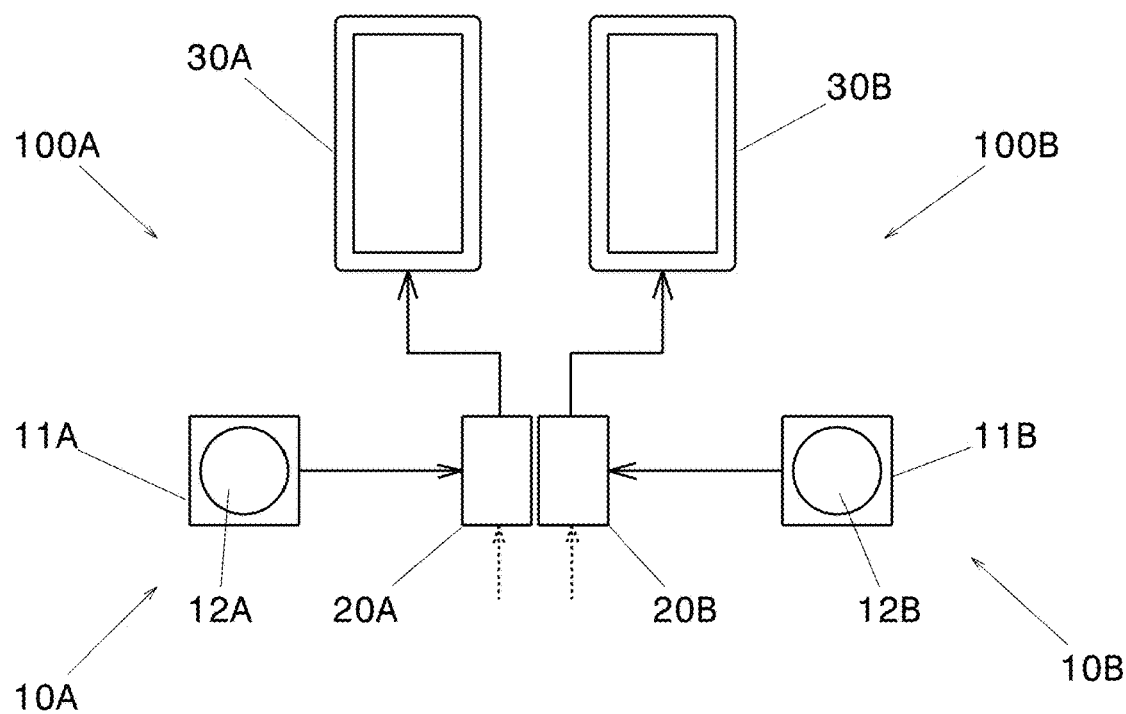
FIG. 2 shows a schematic structure of two view systems according to an embodiment of the invention.

FIG. 2 shows a schematic structure of two view systems 100A, 100B according to the present invention which, for example, form a view system 100A for the left vehicle side and a view system 100B for the right vehicle side. Each of the view systems 100A, 100B has the capture unit 10A, 10B know from FIG. 1, a calculation unit 20A, 20B and a reproduction unit 30A, 30B. Thus, each of the view systems 100A, 100B corresponds to an indirect view system, such as a camera monitor system, and, thus, may be used as mirror replacement system, with which the environment of a vehicle may be indirectly viewed.

The respective capture unit 10A, 10B is adapted for capturing images of an environment around a vehicle 1 in the form of image data. In this respect, the capture unit 10A, 10B is attached to the vehicle in a suitable manner. The capture unit 10A, 10B may be a camera, in particular a camera with a sensor according to a CMOS- or CCD-technology, or may be any other image sensor, which is suitable to capture moved images. A plurality of capture units 10A, 10B may be provided per view system 100A, 100B. Each of the capture units 10A, 10B is in communication with the respective calculation unit 20A, 20B, such as via connection cable or radio/wireless.

The respective calculation unit 20A, 20B is configured for processing the image data captured by the capture unit 10A, 10B. In this respect, the calculation unit 20A, 20B uses predetermined image parameters, such as the resolution, the contrast, the color saturation, color temperature and color tones, the exposure, etc., and changes these or other parameters, in particular for the purpose of optimization of the image depicted on the reproduction unit 30A, 30B. The calculation units 20A, 20B, thus, are also called image processing units. The calculation units 20A, 20B may also receive signals from other elements than the image capture units 10A and 10B and may output signals to further elements of the view system (see dotted arrows).

The respective reproduction unit 30A, 30B is configured for displaying images which are captured by the respective capture unit 10A, 10B and which have been captured by the respective calculation unit 20A, 20B. The reproduction unit 30A, 30B may be a monitor, such as a LCD-, TFT- or LED-monitor. A plurality of reproduction units 30A, 30B may be provided per view system 100A, 100B. The reproduction units 30A, 30B are preferably installed inside a driver's cabin of a vehicle, further preferably at one or both A-columns of a vehicle, such that a driver may view them in an unhindered manner during driving.

The view system 100A is identically constructed as the view system 100B, why in the following only the view system 100A is described.

Figure 3:
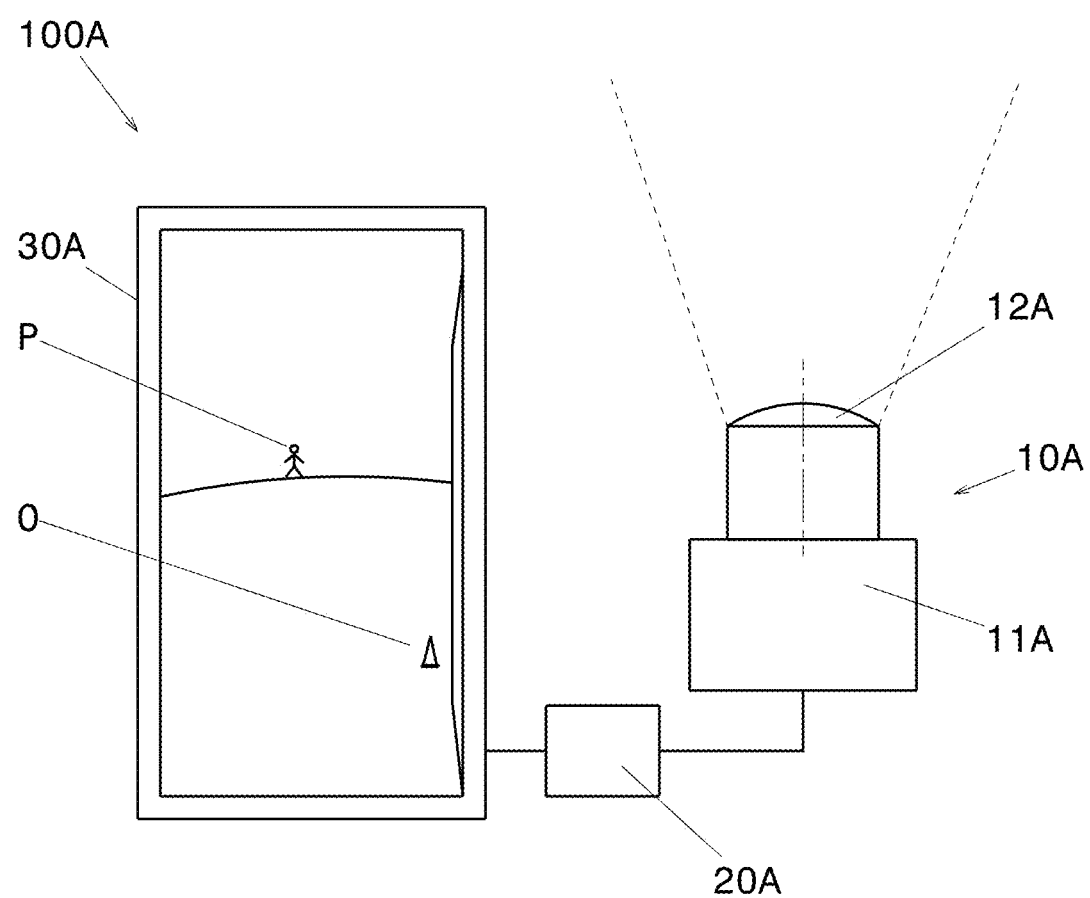
FIG. 3 shows a schematic view of a view system of FIG. 2.

FIG. 3 shows a schematic view of the view system 100A according to the invention which shows the vehicle environment, as it is captured by the camera 10A of FIG. 1 on a monitor 30A. As shown in FIG. 3, the camera 10A has an optical element 12A and an image sensor 11A. The optical element 12A is the component of the camera 10A which is arranged between the image sensor 12A of the camera 10A and the transition from the camera 10A to the vehicle environment, and, thus, forms the outermost closure/ending of the camera 10A in an optical path along which the light of the vehicle environment is moved and spread, respectively, when it falls into the camera 10A. The optical element 12A captures the vehicle environment with a certain area of view (presently a view cone, see dotted line in FIG. 3), which is associated to the corresponding optical element, and presently has a lens which is convex to the outer side as the component which lies furthest to the outside. The image sensor 12A is an apparatus for capturing images of the vehicle environment from light. The image sensor 12A is arranged in the optical path behind the optical element and, thus, within the camera 10A. The optical element 12A and the image sensor 11A form together the essential elements of the camera 10A. Further components, such as, for example, a housing may also be part of the camera 10A.

The image data captured by the camera 10A are transmitted to the image processing unit 20A which processes the image data (e.g., with respect to contrast, resolution, brightness, etc.) such that they are well recognizable on the monitor 30A for the driver of the HGV 1 and, if so, correspond to legal prescriptions such as defined in the UN/ECE R46.

On the monitor 30A, the vehicle environment is shown on the left side of the HGV 1. In particular, on the right side of monitor 30A, a part of the HGV 1 and the object O (pylon) are to be seen, while the person P is shown in center on the monitor.

Figure 4:
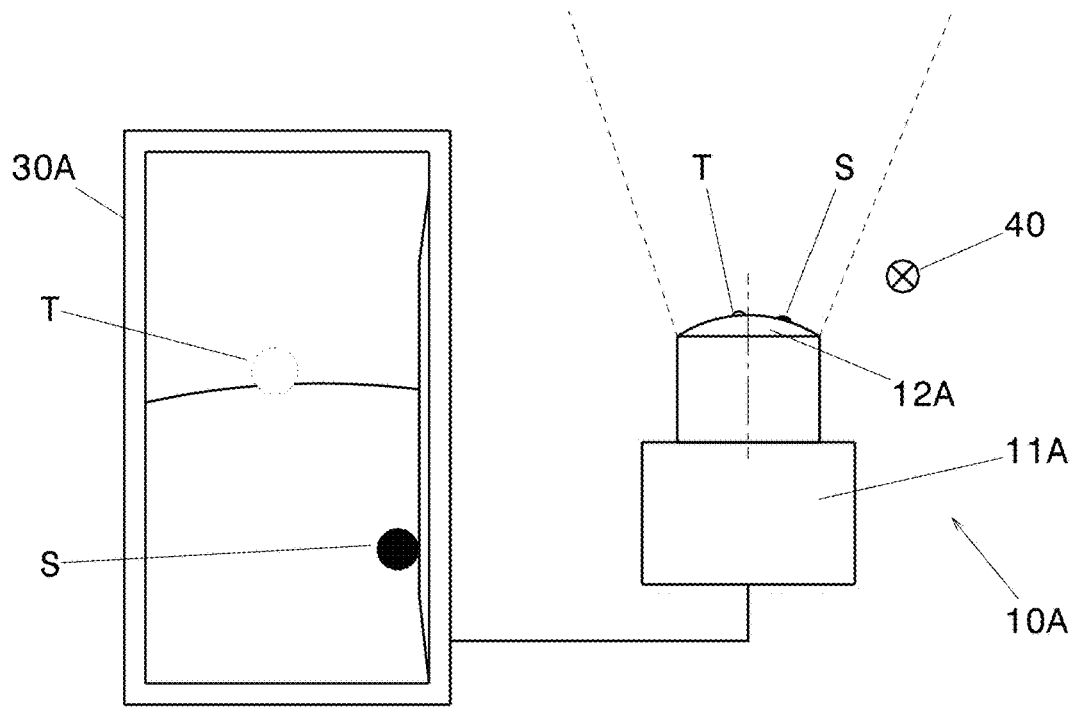
FIG. 4 shows a schematic view of the view system of FIG. 3 with foreign particles on the optical element of the image capture unit (without illumination)

In FIG. 4, the schematic view of the view system 100A of FIG. 3 is shown, wherein presently the image processing unit 20A is integrated into the camera 10A, two foreign particles are located on the optical element 12A and the view system 100A has in addition a light source 40. One of the foreign particles is located on a left side of the optical element 12A, starting from a middle line (see chain line in FIG. 4), and is a water drop T. The other one of the foreign particles is located on a right side of the optical element 12A, starting from the middle line, and is a pollution S (e.g., a clump/clod of earth). The light source 40 is arranged outside the view cone of the optical element 12A, such that it emits light rays from the outer side to the optical element 12A in the switched-on state. In the situation on which FIG. 4 is based, the light source 40 is switched off.

As shown in FIG. 4, both of the foreign particles—with switched-off light source 40—are differently displayed on the monitor 30A. The pollution S is shown on the image sensor 11A and correspondingly on the monitor 30A as dark spot, which hides the environment which lies behind the pollution. Thus, the driver may recognize the pollution, but may not recognize the vehicle environment behind the pollution and, correspondingly, may not recognize, whether and what is located behind the pollution. This may lead to dangerous situations in the road traffic and, if so, to accidents. By the water drop T, the vehicle environment, which is located behind the water drop, is captured on the image sensor 11A in a blurred and, thus, diffuse manner. Correspondingly, also the environment behind the water drop is depicted on the monitor 30A in a blurred and, thus, for the driver unclear manner. Thereby, the driver may not only not recognize, whether and, if so, what is located in the vehicle environment behind the water drop, but may occasionally also not recognize that a water drop is located on the optical element 12A.

Figure 5:
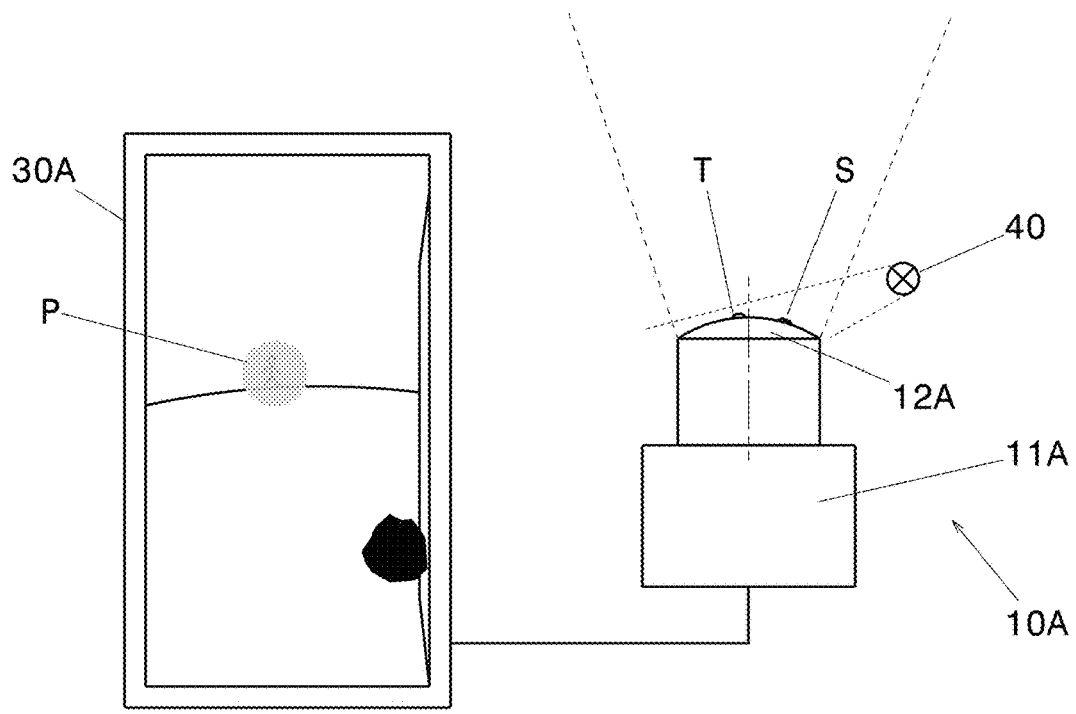
FIG. 5 shows a schematic view of the view system of FIG. 4 with foreign particles on the optical element of the image capture unit (with illumination)

In FIG. 5, the optical element 12A is illuminated by a light source 40. The light source 40 is arranged to the optical element 12A such that the light emitted therefrom hits the optical element from the outside. In other words, the light of the light source 40 runs along an optical path, which extends from the environment of the vehicle 1 and, thus, the camera 10A through the optical element 12A to the image sensor 11A.

By the illumination of the optical element 12A, the foreign particles, i.e., the pollution S and the water drop T, are depicted on the image sensor 11A in a more high-contrast manner than this would be case without illumination, as shown in FIG. 4. That is, the foreign particles S, T are clearly recognizable on the image sensor 11A and, thus, are depicted conspicuously. The depiction of the vehicle environment with the clearly depicted foreign particles is transmitted via a (not shown) image processing unit to the monitor. The image processing unit processes the image data, however, only with respect to image parameters, which allow a reliable and, if so, required display quality of the vehicle environment (e.g., resolution, brightness, etc.). No pre-processing of image data for identification of the foreign particles S, T is necessary.

As shown in FIG. 5, the pollution S on the optical element 12A is shown to the driver as dark spot with irregular edges, which is larger than the depiction of the pollution S on the monitor 30A in FIG. 4. Specifically, the light emitted by the light source 40 is absorbed by the pollution S in that the pollution is very dark (e.g., earth), and is depicted as a dark spot on the image sensor 11A. Thereby, the driver may quickly recognize that the optical element 12A is polluted. Whereas, the water drop T is shown to the driver on the monitor 30A as bright spot with sharper contours compared to the bright spot on the monitor of FIG. 4. Specifically, the light emitted by the light source 40 is reflected by the water drop T in that the water drop is almost transparent. Thus, at least a part of the light rays emitted by the light source 40 are directed to the image sensor 11A. By means of the sharper contours, the driver may quickly recognize that a foreign particle is located on the optical element 12A and recognizes, as shown in FIG. 5, even at least partially the environment, which is hidden by the water drop T (person P is easily to be seen).

Figure 6:
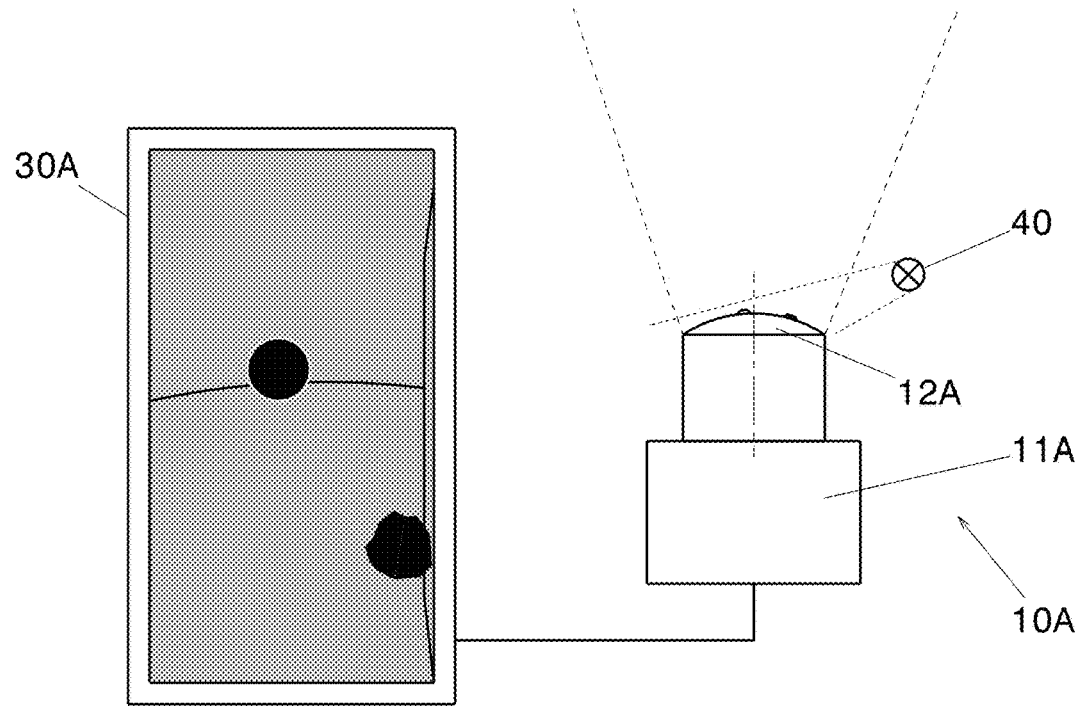
FIG. 6 shows a schematic view of the view system of FIG. 4 with illuminated foreign particles in darkness.

FIG. 6 shows a display of the foreign particles S, T in a dark vehicle environment, such as at night. As it is shown in FIG. 6, an illumination of the optical element 12A in a dark vehicle environment increases the conspicuousness and recognizability, respectively, of foreign particles S, T with illumination with light such that both the pollution S and the water drop T are shown as dark spots on the monitor 30A.

Figure 7:
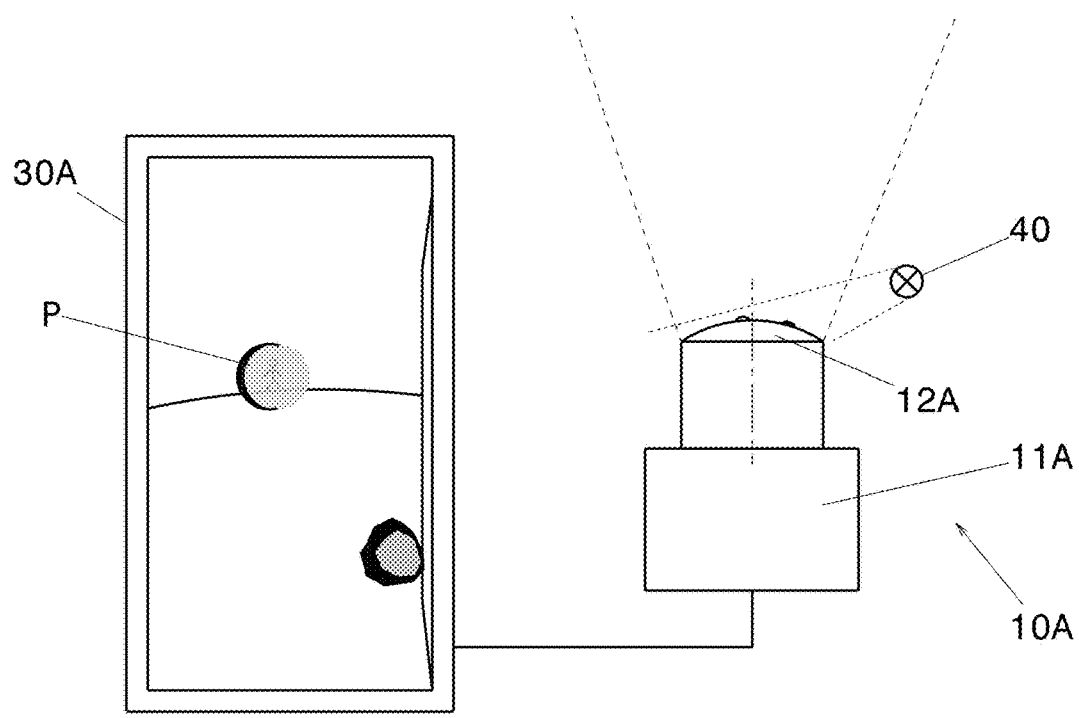
FIG. 7 shows a schematic view of the view system of FIG. 4 with illuminated foreign particles with formation of shades.

FIG. 7 shows a display of foreign particles S, T on the monitor 30A by means of formation of shades. The display resembles the display of FIG. 5. However, both the display of the water drop T and the pollution S are provided with shades, in order to increase the conspicuousness of the foreign particles S, T on the monitor 30A.

Figure 8:
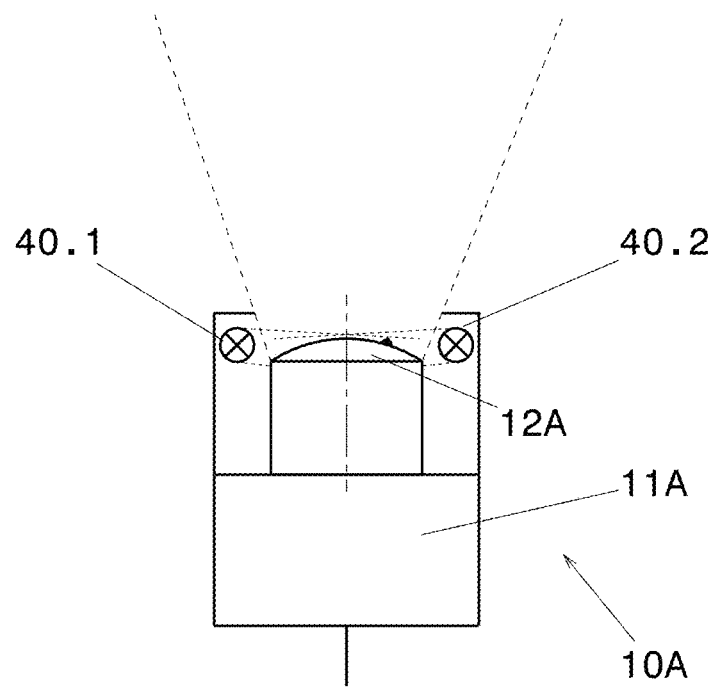
FIG. 8 shows an image capture unit according to the invention which is illuminated from two light sources.

FIG. 8 shows a camera 10A which is illuminated by two light sources 40.1, 40.2. The light source 40.1 is arranged in FIG. 8 on the left next to the optical element 12A, while the light source 40.2 is arranged in FIG. 8 on the right next to the optical element 12A. Both light sources 40.1, 40.2 emit their light rays to the optical element 12A, such that the light rays hit the image sensor 11A from outside of the camera 10A through the optical element 12A and depict the vehicle environment together with the light of the vehicle environment thereon.

It is also conceivable to arrange more than two light sources 40 around the optical element 12A in regular or irregular intervals or to connect an optical wave guide, through which the light of the light sources is at least partially distributed and, if so, bundled around the optical element, to one or more light sources 40, such that it reliably hits the optical element 12A.

The light source 40 may be any light source with any wave length. LEDs, OLEDs, laser, light bulbs, black light, etc. are, for instance, conceivable as light source 40. In this respect, it is advantageous, if the light source is located in a certain spatial vicinity to the optical element 12A, such as in a range from 0 to 30 mm. In this respect, however, the light source should lie outside the view portion and the view cone, respectively, of the optical element 12A, such that it is not depicted on the image sensor 11A itself. In order to depict foreign particles S, T in a more clear manner on the image sensor 11A, the optical element 12A may be provided with a filter, such as a coating, which results in that the foreign particles S, T are depicted in a particular high-contrast and conspicuous manner on the image sensor at certain wavelengths (such as ultraviolet rays at black light).

The clear display of foreign particles S, T on the optical element 12A may be recognized by the driver himself by a corresponding high-contrast and contour-sharp display on the monitor 30A. Alternatively or additionally, the processing unit 20A may detect the presence of foreign particles S, T by a high-contrast depiction of foreign particles S, T on the image sensor 11A. Correspondingly, the driver may either output a signal (operating of a button, touch pad, or the like), which causes either the cleaning of the optical element 12A (such as an automatic cleaning), or may stop the vehicle and clean the optical element by hand. The image processing unit 20A or any other control unit may also output signals for cleaning the optical element 12A and/or may indicate to the driver by means of corresponding signals (e.g. overlays, alerts, etc.) that the optical element 12A has at least one foreign particle S, T thereon and that the view in the vehicle environment is limited, such that the driver may act correspondingly. The image processing unit 20A or the other control unit may monitor the presence of foreign particles parallel to the driver or may be employed only, when the driver does not view into the monitor or cannot view into the monitor (such as during complicated driving maneuvers). The present invention, thus, serves for recognition and monitoring of the usability of the camera 10A.

It is explicitly stated that all features disclosed in the description and/or the claims are intended to be disclosed separately and independently from each other for the purpose of original disclosure as well as for the purpose of restricting the claimed invention independent of the composition of the features in the embodiments and/the claims. It is explicitly stated that all value ranges or indications of groups of entities disclose every possible intermediate value or intermediate entity for the purpose of original disclosure as well as for the purpose of restricting the claimed invention, in particular as limits of value ranges.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A view system for a vehicle, comprising:
   at least one image capture unit for capturing image data of an area around the vehicle, wherein the image capture unit has an image sensor and an optical element,
   at least one image processing unit for processing the image data captured by the image capture unit, and
   at least one light source for illuminating the optical element,
   wherein the view system is configured to highlight the recognizability of a foreign particle (S, T), which is located on the optical element, on the image sensor of the image capture unit by the illumination of the optical element; and
   wherein the light source has a luminous intensity and/or a luminous density and/or a luminous flux, each of which is adjustable.

2. The view system according to claim 1, wherein the light rays emitted by the light source fall into the optical element from outside of the image capture unit.

3. The view system according to claim 1, further comprising at least one image reproduction unit for reproducing the image data processed by the image processing unit.

4. The view system according to claim 1, further comprising an image recognition unit which recognizes the highlighted recognizability of the foreign particle (S, T) on the image sensor by use of an algorithm.

5. The view system according to claim 4, wherein the image recognition unit is adapted, if it detects a foreign particle, to output a signal for removal of the foreign particle and/or signal the driver.

6. The view system according to claim 1, wherein the light source is arranged outside of the area of view of the optical element.

7. The view system according to claim 1, wherein the contrast of the foreign particle (S, T) on the image sensor is highlighted by reflection and/or absorption of the light rays emitted by the light source at the foreign particle (S, T).

8. The view system according to claim 1, wherein the light source is arranged such that the light rays emitted by the light source hit directly the optical element.

9. The view system according to claim 1, wherein the light source is arranged such that the light rays emitted by the light source hit indirectly the optical element.

10. The view system according to claim 1, wherein the light source is arranged such that the main part of the light rays emitted by the light source hits a portion of the optical element which is depicted on the image sensor.

11. The view system according to claim 1, wherein the light source is configured to operate with different light waves.

12. The view system according to claim 11, wherein the light source is configured to operate with light waves which are visible for the human eye.

13. The view system according to claim 11, wherein the light source is an infrared-light source, which emits light waves in the near, middle and/or far infrared portion.

14. The view system according to claim 1, wherein the light source is configured to operate permanently or in timely defined intervals.

15. The view system according to claim 3, wherein the light source is configured to operate permanently or in timely defined intervals.

16. The view system according to claim 15, wherein the light source is configured to operate dependent on the image rate of the image sensor and/or the image recognition unit and the reproduction unit, respectively.

17. The view system according to claim 1, wherein the light source is arranged to the optical element such that the light rays emitted by the light source are not visible from defined view directions in the vehicle environment for the human eye.

18. The view system according to claim 1, wherein the optical element comprises as the outermost component a front glass or a lens.

19. The view system according to claim 1, wherein the optical element has a filter, which changes at least one illumination parameter during illumination.

20. The view system according to claim 1, wherein the light source is located in spatial vicinity to the optical element.

21. The view system according to claim 1, wherein a plurality of light sources is present.

22. The view system according to claim 21, wherein a converging lens is present, which bundles the light rays of the plurality of light sources before reaching the optical element.

23. The view system according to any claim 1, wherein the light source comprises an optical wave guide.

24. The view system according to claim 1, wherein the light source is an LED or an OLED or a laser or diode or light bulb or halogen lamp or black light.

25. The view system according to claim 1, wherein the view system is a mirror replacement system for a commercial vehicle.

26. The view system according to claim 25, wherein the mirror replacement system is a camera monitor system for one or more of the fields of view I to VI of UN/ECE R46.

27. A mirror replacement system for a vehicle with a view system (100A, 100B) according to claim 1.

* * * * *